March 4, 1969  L. J. WOLF  3,430,975

TRAILER STEERING ARRANGEMENT

Filed Feb. 8, 1967  Sheet 1 of 2

INVENTOR
LLOYD J. WOLF
BY *Badell & Burgess*
ATTORNEYS

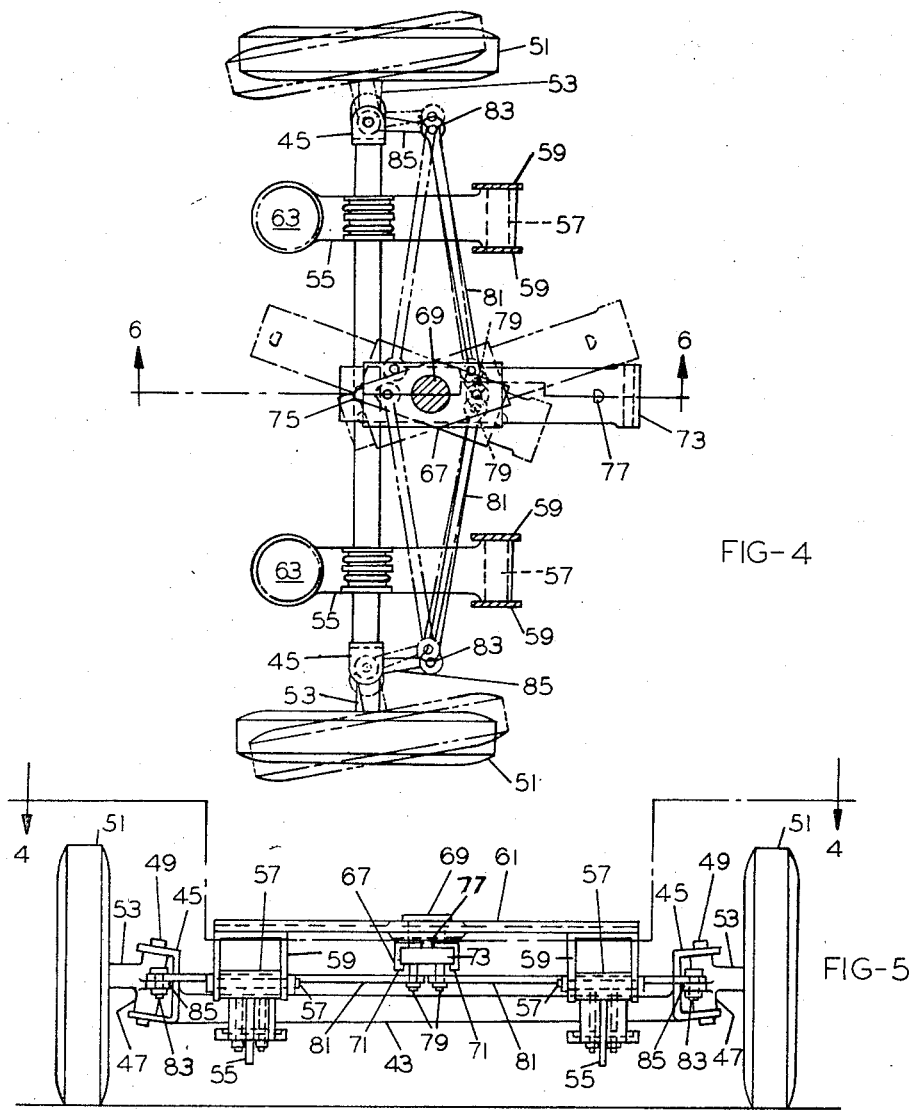

United States Patent Office 3,430,975
Patented Mar. 4, 1969

3,430,975
TRAILER STEERING ARRANGEMENT
Lloyd J. Wolf, 2425 Irving Blvd., Dallas, Tex. 75207
Filed Feb. 8, 1967, Ser. No. 614,729
U.S. Cl. 280—103    11 Claims
Int. Cl. B62d 13/00, 7/16

ABSTRACT OF THE DISCLOSURE

A road trailer having an automotive-type front axle, a draft tongue pivoted to the front end of the trailer and movable along its axis relative to the pivot, steering links pivotally connected to the tongue forwardly of the tongue pivot when the trailer is being towed and rearwardly of the tongue pivot when the trailer is being pushed by the tongue, shifting of the steering link pivots being accomplished by axial movement of the tongue respectively responsive to towing or pushing forces on the tongue, whereby the trailer front wheels are properly steered irrespective of the direction of movement.

---

The invention relates to land vehicles and consists particularly in improved steering means for four-wheel road trailers.

As a four-wheel road trailer with an automotive type front axle is pulled forwardly, movement of its tongue in either direction transversely of the trailer produces, through the steering linkage, a corresponding angling of the front wheels, causing the trailer to follow the preceding vehicle. In conventional constructions, as the trailer is pushed rearwardly, the tongue will be forced toward the outside of the turn and the connection of the tongue to the steering links forwardly of the tongue pivot will cause the wheels to angle like the tongue just as during forward movement and this will cause the trailer to steer in the opposite direction from that of the pulling vehicle.

It is accordingly an object of the invention to provide a steering system for four-wheel road trailers having automotive type front axles, in which rearward turning movement of the draft vehicle will cause the trailer to turn in the same direction as the draft vehicle. A further object is to provide means connecting the trailer draft tongue to the front axle steering links alternately forwardly and rearwardly of the tongue pivot to the trailer responsive to changes in direction of movement.

The foregoing and additional more detailed objects and advantages of the invention will be evident from the following description and the accompanying drawings in which:

FIG. 4 is a horizontal sectional view of a modified form of the invention, along line 4—4 of FIG. 5.

FIG. 5 is a front elevation view of the structure illustrated in FIG. 4.

FIG. 6 is a longitudinal vertical sectional view along line 5—5 of FIG. 4.

Figure 1:
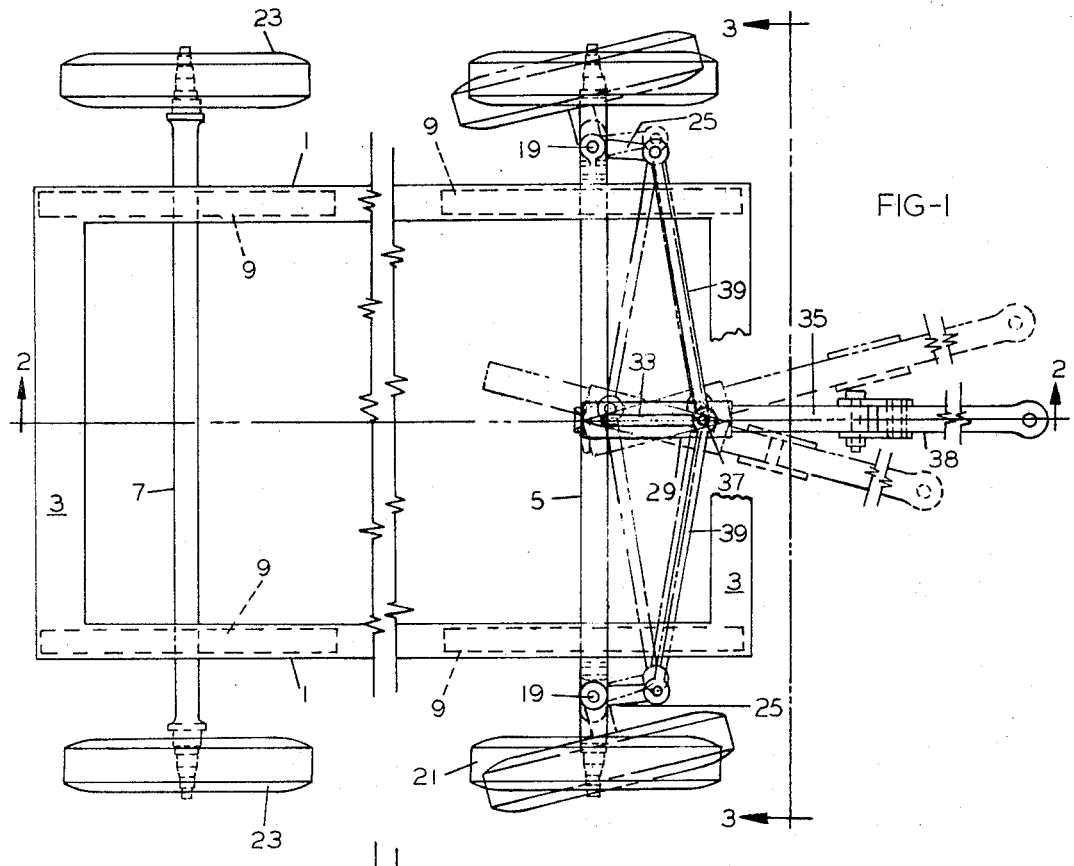
FIG. 1 is a plan view of a road trailer suspension with steering linkage embodying the invention.
Figure 2:
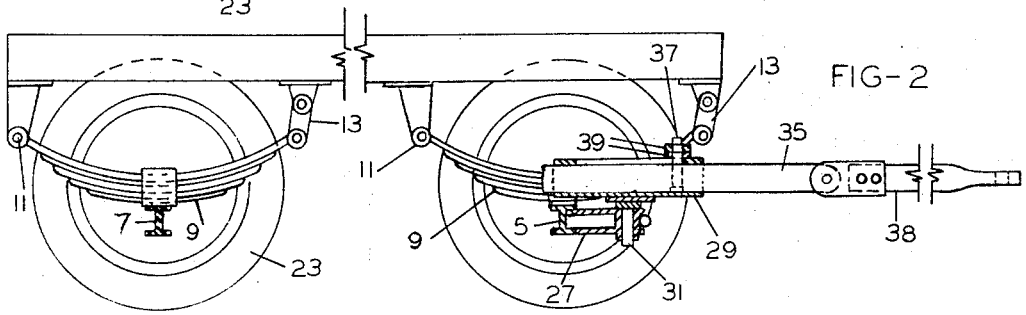
FIG. 2 is a longitudinal vertical sectional view along line 2—2 of FIG. 1.
Figure 3:
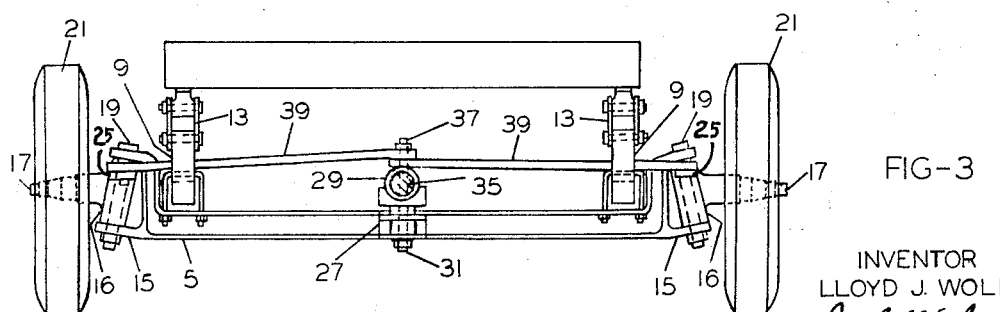
FIG. 3 is a front elevation along line 3—3 of FIG. 1.

The trailer underframe comprises longitudinally extending side sills 1, 1 connected at their ends by transverse end sills 3, 3. Underframe 1, 3 is supported on front axle 5 and rear axle 7 by any suitable resilient means, such as leaf springs connected at their midpoints to the supporting axles, and pivotally at their one ends to brackets 11 depending from the side sills and at their other ends to shackles 13 pivotally depending from the side sills.

Front axle 5 is bifurcated at its ends as at 15, and there pivotally mounts steering knuckles 16 by means of substantially upright kingpins 19, 19. Front wheels 21 are rotatably journaled on wheel spindle portions 17 of knuckles 16.

Similar wheels 23 are rotatably journaled directly on the ends of rear axle 7.

Steering knuckles 16 are formed with forwardly extending steering arms 25.

To provide for proper steering of front wheels 21 when the trailer is being pushed rearwardly, front axle 5 is provided at its center with a forwardly extending bracket 27, and a longitudinally extending tube 29, normally aligned with the longitudinal center line of the trailer, mounts a depending pivot pin 31, pivotally journaled in the forward end of bracket 27. The distance of the axis of pivot pin 31 forward of axle 5 is equal to the effective length of the steering arms 25. Along its vertical diametral plane, the upper surface of tube 29 is formed with an elongated slot 33 spaced a short distance from both ends of the tube with its ends equidistant from tube pivot 31 and a cylindrical tongue 35 is slidably mounted within tube 29. Tongue 35 is provided near its rear end with an upwardly projecting pin 37, which projects through tube slot 33. For connection with a draft vehicle (not shown), a drawbar 38 is connected by a transverse horizontal pivot pin 40 to the projecting forward end of tongue 35.

Externally of tube 29, a pair of generally transversely extending steering links are pivotally connected to pin 37 at their adjacent inner ends, and their outer ends are pivotally connected to the forward extremities of steering arms 25, so that when pin 37 is positioned at the forward end of slot 33 by the application of draft (pulling) forces to tongue 35, any angling of the tongue caused by turning movements of the leading vehicle (not shown) will cause a corresponding movement of the front wheels. For example, in FIG. 1, if the leading vehicle makes a left turn, tongue 35 will move to the upper broken line position, causing links 39 and steering arms 25 to direct the wheels similarly. If, on the other hand, the draft vehicle is pushing the trailer, tongue 35 will be moved rearwardly through tube 29, until pin 37 engages the rear end of slot 33. The effect of this relocation of pin 37 and steering links 39 rearwardly of tube pivot pin 31 may be best understood by reference to FIG. 1, assuming that the draft vehicle is pushing the trailer around a right hand turn. The longitudinal component of the pushing force will move tongue 35 rearwardly through tube 29 until pin 37 engages the rear end of slot 33 and the transverse component of this force will move the tongue to the lower broken line position, so that pin 37 is also somewhat left of center, causing front wheels 25 to turn slightly to the left (the proper direction for making a right turn while backing), as shown in broken lines in FIG. 1. It will be evident from the foregoing, that a forward left turn and a rearward right turn will cause the front wheels to assume the same directions.

In the modified form of the invention, illustrated in

FIGS. 4-6, front axle 43 is formed with bifurcated ends 45, in which steering knuckles 47 are mounted by means of substantially upright kingpins. Front wheels 51 are rotatably journaled on the spindle portions 53 of steering knuckles 47.

The front axle may support the front of the vehicle in any known manner, and for purpose of illustration only, the disclosed support comprises longitudinally extending arms 55 clamped intermediate their ends to the underside of the axle and pivotally connected at their forward ends at 57 to brackets 59 depending from vehicle underframe mounting plate 61. At its rear end, each arm 55 seats an upstanding spring 63 on which plate 61 rests.

Forwardly of the axle, plate 61 is circularly apertured on the longitudinal center line of the vehicle as at 65, and a longitudinally extending inverted channel member 67 is provided with an upstanding pivot pin 69 journaled in aperture 65. Channel member 67 is formed with inwardly-turned flanges 71 along its lower margins and an elongated flat rectangular section tongue 73 is slidably received in the hollow interior of channel member 67. Movement of tongue 73 lengthwise of channel 67 is limited by longitudinally spaced projections 75 and 77 on the upper surface of the tongue, which are adapted to engage the rear and forward rims of channel 67 during forward and rearward movements respectively of the vehicle. Depending from the lower surface of tongue 73 intermediate projections 75 and 77 are a pair of vertical pins 79, and to the latter are pivotally secured the adjacent inner ends of generally transversely extending steering links 81, the outer ends of which are pivotally secured at 83 to steering arms 85, the effective lengths of which are equal to the distance from the axle center to the axis of pivot pin 69. With this arrangement, when tongue 73 is being pulled, steering link pins 79 will be forward of channel member pivot pin 69 and the steering links will be in the solid line position of FIG. 1, causing the wheels to assume the broken line position when, for example, the trailer is pulled to the left. Conversely, when the trailer is pushed, tongue 73 will slide rearwardly through channel 67 until projection 77 engages the front rim of channel member 67 and steering link pins 79 are the same distance to the rear of channel member pivot pin 69 as they were forward of the latter during pulling movements, so that when, for example, the draft vehicle is making a right turn to the rear, tongue 73, pins 79 and steering links 81 will assume the broken line position of FIG. 1, causing the wheels to do the same, and thus steering the trailer to the right as it is pushed rearwardly.

It will be understood that details of the steering means disclosed herein may be varied substantially without departing from the spirit of the invention and the exclusive use of these modifications as come within the scope of the appended claims is contemplated.

What is claimed is:

1. In a road vehicle, structure comprising a front axle, steering knuckles pivotally connected on substantially upright axes to the ends of said axle, an element elongated lengthwise of the vehicle, means pivotally connecting said element to the center of the vehicle structure forward of said front axle for movement about a vertical axis, a draft tongue mounted on said element and slidable lengthwise thereof responsive to draft and pushing forces on said tongue, pivot-forming means on said draft tongue, substantially transversely extending links connected at one of their ends to said pivot-forming means, forwardly extending steering arms on said knuckles, pivotal connections between the other ends of said links and said arms, said pivotal connecting means being positioned substantially abreast of said pivotal connections and cooperating stop means on said tongue and said elongated element limiting movement of said tongue between positions in which said pivot-forming means are substantially equally spaced in opposite directions lengthwise of said elongated member from said pivotal connecting means.

2. In a road vehicle according to claim 1, said pivotal connecting means comprising a bracket extending forwardly from the center of said axle.

3. In a road vehicle according to claim 1, said elongated member being hollow and open at both ends, said tongue passing through said elongated element, said elongated element having an opening elongated lengthwise of said element in one of its surfaces, said pivot forming means projecting outwardly through said opening.

4. In a road vehicle according to claim 3, said pivotal connecting means being located below said elongated element and said opening being located above said tongue.

5. In a road vehicle according to claim 4, said pivotal connecting means including a bracket on the center of said axle.

6. In a road vehicle according to claim 3, said pivotal connecting means being located above said elongated element and said opening being located below said tongue.

7. In a road vehicle structure comprising a front axle, steering knuckles pivotally connected on substantially upright axes to the ends of said axle, an element elongated lengthwise of the vehicle, means pivotally connecting said element to the center of the vehicle structure forward of said front axle, a draft tongue mounted on said element and slidable lengthwise thereof responsive to draft and pushing forces on said tongue, pivot-forming means on said draft tongue, substantially transversely extending links connected at one of their ends to said pivot-forming means, forwardly extending steering arms on said knuckles, said links being connected at their other ends to said arms, cooperating stop means on said tongue and said elongated element limiting movement of said tongue between positions in which said pivot-forming means are spaced in opposite directions lengthwise of said elongated member from said pivotal connecting means, said elongated member being hollow and open at both ends, said tongue passing through said elongated element, said elongated element having an opening elongated lengthwise of said element in one of its surfaces, said pivot-forming means projecting outwardly through said opening, said elongated element being tubular and said elongated opening therein being a closed end slot with its ends spaced from both ends of said element, said tongue being cylindrical, said pivot-forming means comprising a radially disposed pin fixed to said tongue and said stop means comprising opposing surfaces of said pin and said slot ends.

8. In a road vehicle structure comprising a front axle, steering knuckles pivotally connected on substantially upright axes to the ends of said axle, an element elongated lengthwise of the vehicle, means pivotally connecting said element to the center of the vehicle structure forward of said front axle, a draft tongue mounted on said element and slidable lengthwise thereof responsive to draft and pushing forces on said tongue, pivot-forming means on said draft tongue, substantially transversely extending links connected at one of their ends to said pivot-forming means, forwardly extending steering arms on said knuckles, said links being connected at their other ends to said arms, cooperating stop means on said tongue and said elongated element limiting movement of said tongue between positions in which said pivot-forming means are spaced in opposite directions lengthwise of said elongated member from said pivotal connecting means, said elongated member being hollow and open at both ends, said tongue passing through said elongated element, said elongated element having an opening elongated lengthwise of said element in one of its surfaces, said pivot-forming means projecting outwardly through said opening, said elongated element being a channel with inwardly directed terminal flanges, said tongue being of rectangular section corresponding to the interior of said channel, said elongated opening being defined by the inner edges of said terminal flanges.

9. In a road vehicle according to claim 8, said stop means comprising projections on said tongue spaced apart a greater distance longitudinally of the tongue than the length of said channel and engageable with the ends of the latter to limit movements of said tongue therethrough.

10. In a road vehicle according to claim 9, said pivot forming means comprising a pair of pins in side by side relation projecting from a horizontal surface of said tongue.

11. In a road vehicle according to claim 1, said structure to which said elongated member is pivotally connected being spring supported on said axle at a higher level than said axle.

References Cited

UNITED STATES PATENTS

| 1,856,997 | 5/1932 | Jacobs | 280—443 |
| 2,047,206 | 7/1936 | Knapp | 280—103 |
| 2,608,417 | 8/1952 | Kelsey | 280—103 |
| 3,195,915 | 7/1965 | Moore | 280—103 |

LEO FRIAGLIA, *Primary Examiner.*

U.S. Cl. X.R.

280—443